Oct. 31, 1950     J. O. HAMILTON ET AL     2,527,812
APPARATUS FOR ASSEMBLING POTENTIOMETERS
Filed July 20, 1945     3 Sheets-Sheet 1

INVENTORS
J. O. HAMILTON
L. J. ROZANKOWSKI
BY
ATTORNEY

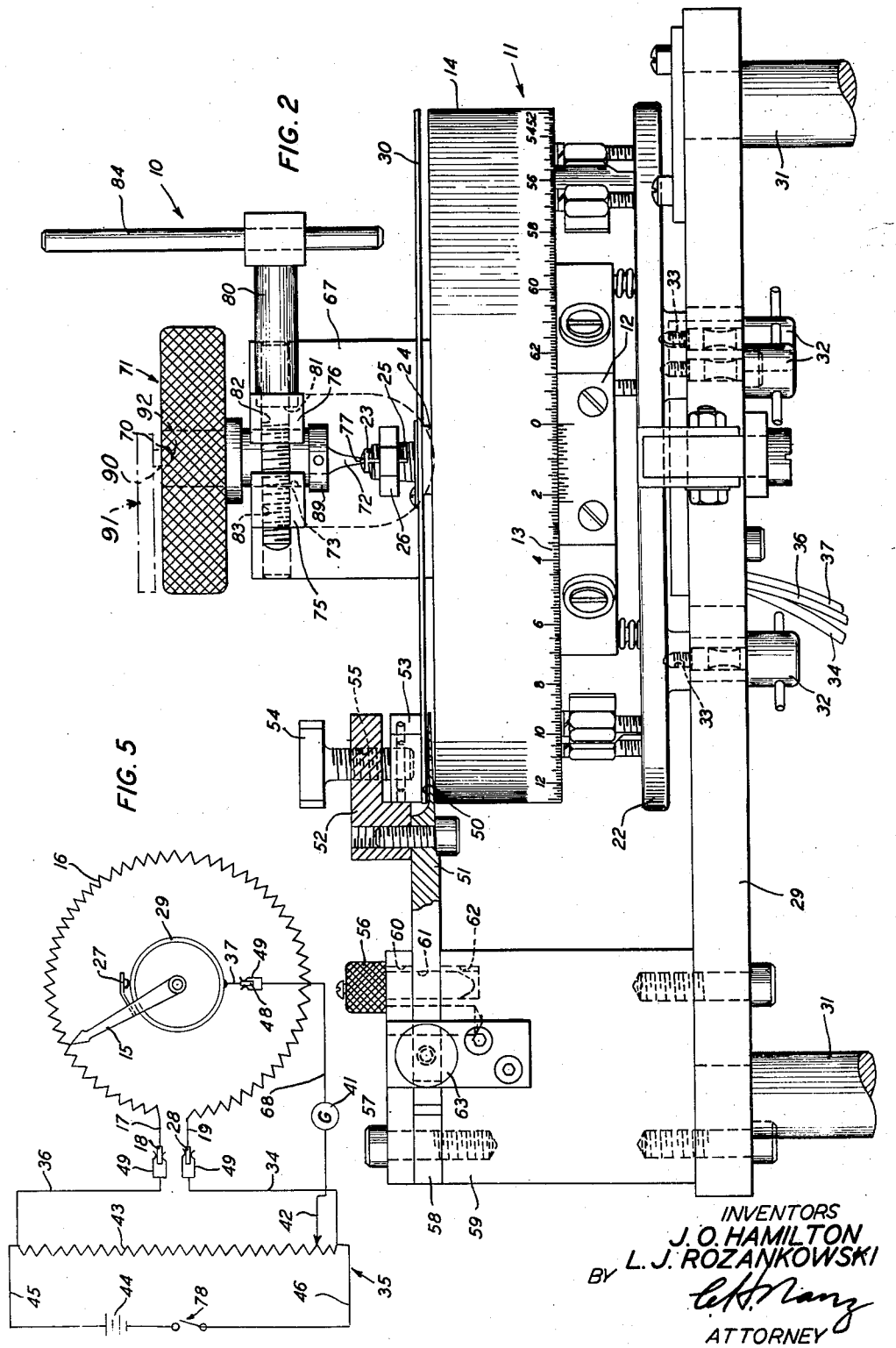

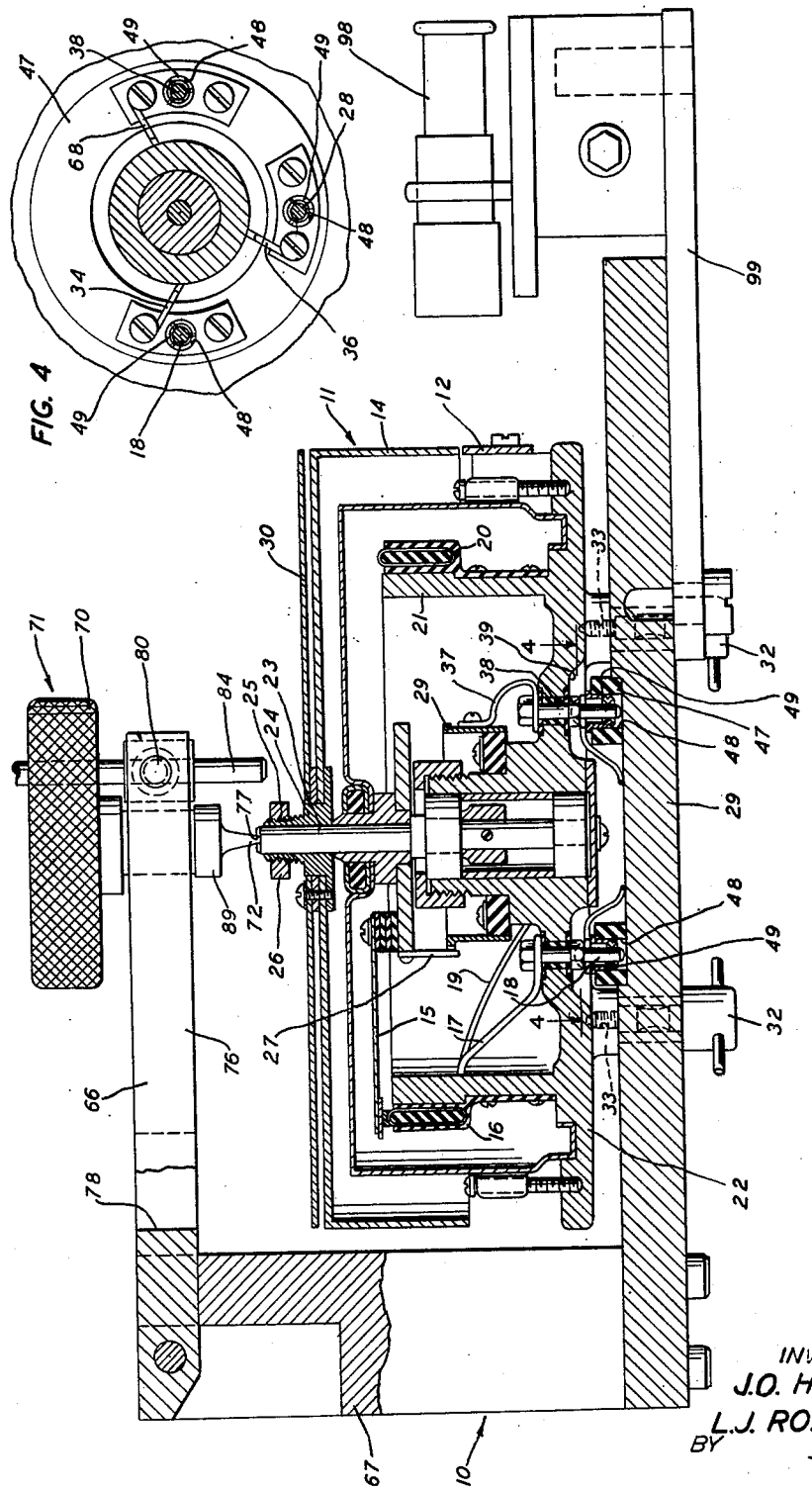

Patented Oct. 31, 1950

2,527,812

UNITED STATES PATENT OFFICE 2,527,812

APPARATUS FOR ASSEMBLING POTENTIOMETERS

James O. Hamilton, Dundalk, and Leon J. Rozankowski, Baltimore, Md., assignors to Western Electric Company, Incorporated, New York, N. Y., a corporation of New York Application July 20, 1945, Serial No. 606,217

1 Claim. (Cl. 29—203)

This invention relates to apparatus for assembling articles, and has for its object the provision of new and improved apparatus for assembling articles.

One fixture embodying the invention serves to assemble and test a potentiometer which includes a potentiometer card, a pointer, a dial having a scale thereon and movable with respect to the potentiometer card and the pointer, and a brush assembly designed to be secured to the dial for movement therewith for contacting the potentiometer card. The fixture includes means for fastening the potentiometer card and the pointer in fixed positions, a test set associated with said means for determining the location of the brush assembly with respect to the potentiometer card, and means for holding the dial stationary with respect to the potentiometer card and the pointer so that the brush assembly may be located correctly with respect to the dial and the potentiometer card and fastened to the dial in that position.

Further features of the invention are the provision of a fixture including means for holding a base plate of a potentiometer in a fixed position with a potentiometer card and a pointer rigidly mounted on the base plate held in fixed positions, means for clamping a dial having a scale formed thereon of the potentiometer in a predetermined position with respect to the pointer, means for adjusting the position of the clamping means to adjust the position of the dial with respect to the pointer, a screwdriver, a pivotally mounted arm carrying a screwdriver for positioning it in operative engagement with a rotatable shaft of the potentiometer, a test set for locating the position with respect to the potentiometer card of a brush assembly carried by the shaft of the potentiometer, means for clamping the screwdriver against rotation relative to the dial after the brush assembly has been moved to a position on the potentiometer card corresponding to the reading of the pointer on the scale so that the shaft may be secured to the dial in that position, and means for applying a predetermined torque to the screwdriver to test the fastening of the shaft to the dial.

A complete understanding of the invention may be obtained from the following detailed description of an assemblying fixture forming one embodiment thereof, when read in conjunction with the appended drawings, in which:

Fig. 2 is a fragmentary front elevation of the fixture shown in partial section;

Fig. 3 is a fragmentary vertical section taken along line 3—3 of Fig. 1;

Fig. 4 is a fragmentary sectional view taken along line 4—4 of Fig. 3; and

Fig. 5 is a diagrammatic view of an electrical circuit embodied in the fixture.

Figure 1:
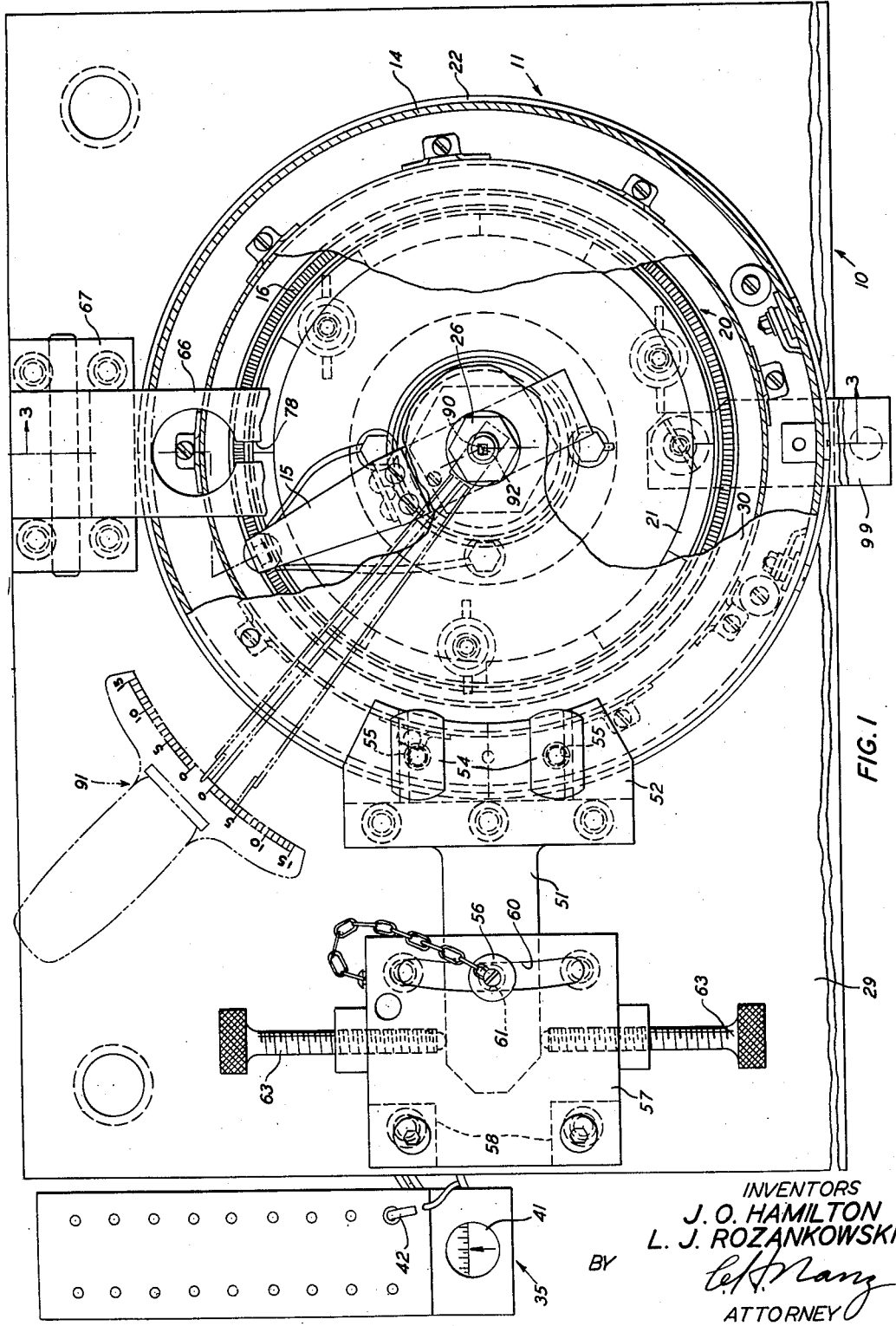
Fig. 1 is a top plan view of an assemblying fixture embodying the invention, with portions thereof broken away.

Referring now in detail to the drawings, there is shown therein a fixture 10 (Fig. 1) for assemblying and testing a potentiometer 11, which includes stationary pointer 12 formed on a base 22, and has a scale 13 formed on a rotatable dial 14 thereof. A brush assembly 15 contacts a resistance wire 16 of an annular potentiometer card 20 and may be moved along the resistance wire. The annular potentiometer card is fastened to a cylindrical projection 21 formed on the base 22, and a shaft 23 is rotatable on an axis forming the center of the annular potentiometer card. The brush assembly 15 is rigidly fastened to the shaft 23, and a collar 24 (Fig. 3) having an externally threaded chuck portion 25 is positioned over the shaft. A nut 26 threaded on the chuck portion may be tightened, after the brush assembly 15 and the dial 14 have been orientated with respect to each other, to secure the collar 24 rigidly to the shaft so that no relative movement can occur between brush assembly 15 and the dial 14. This also secures a disc 30 fastened rigidly to the collar 24 to the shaft 23.

The zero end of the resistance wire 16 is connected by a lead 17 to a terminal post 18, and the unity end thereof is connected by a lead 19 to a terminal post 28. A brush assembly 27 connects the brush assembly 15 to a slip ring 29, which is connected by a conductor 37 to a terminal post 38. The terminal posts project into an annular cavity 39 formed in the base 22 of the potentiometer 11 at predetermined points therein. A ring 47 (Fig. 4) made of insulating material and having sockets 48—48 formed therein for receiving the terminal posts 18, 28 and 38 fits into the annular cavity 39 (Fig. 3). A plurality of resilient contactors 49—49 secured to the ring project into the sockets and contact the terminal posts.

The ring 47 is fitted into the annular cavity 39 in the base 22 of the potentiometer and the contactors 49—49 contact the terminal posts 18, 28 and 38, which project into the sockets 48—48 formed in the ring. With the nut 26 loosened, the potentiometer 11 is placed upon a base plate 29 supported by posts 31—31 (Fig. 2) and thumbscrews 32—32 are threaded into tapped bores 33—33 formed in the base 22 of the potentiometer to orientate the base, the annular potentiometer card 20 and the pointer 12 with respect to the fixture 10. A conductor 34 connected to a resistance 43 of an adjustable test set 35 for measuring ratios of resistances of portions of the resistance wire 16 to the resistance of whole resistance wire connects to the contactor connected to the terminal post 18 to one end of the resistance 43. A second conductor 36 of the test set 35 connects to the contactor, which contacts the terminal post 28, to the other end of the resistance 43, and a third conductor 63 connects the terminal post 38 to a galvanometer 41, which is connected adjustably by a conductor 42 to the resistance 43 of the test set 35. The ends of the resistance 43 are connected to a source 44 of electrical potential by conductors 45 and 46. The test set 35 serves to indicate whether the position of the brush assembly 15 with respect to the resistance wire 16 corresponds to the position of the conductor 42 on the resistance 43 in a manner well known to those skilled in the art of electrical testing.

The dial 14 then is moved, if necessary, to a position in which the pointer 12 reads zero on the scale 13 formed on the dial 14. A microscope 98 mounted on an arm 99 rotatably mounted on the base plate 29 enables an operator of the fixture 10 to take the reading of the pointer 12 on the scale 13 with a high degree of accuracy. The disc 30 (Fig. 2) extends over a lower jaw 50 formed on a tongue 51. A plate 52 of L-shaped cross section is bolted to the lower jaw 50 and an upper jaw 53 is mounted on the plate 52 by a pair of thumb screws 54—54, which pass through tapped bores 55—55 formed in the plate 52. The thumbscrews 54—54 may be threaded farther through the bores 55—55 to force the upper jaw 53 against the plate 30 to clamp the plate 30 tightly between the jaws 50 and 53.

The tongue 51 is secured between a plate 57 and a block 59, which are separated by spacers 58—58, by a pin 56, which projects through an arcuate guide slot 60 formed in the plate 57 concentrically with respect to the shaft 23, a bore 61 formed in the tongue 51 and an arcuate guide slot 62 formed in the block 59. The guide slot 62 is parallel with the guide slot 60, and the pin 56, which may be removed from the arcuate guide slots and the bore 61, holds the tongue 51 against longitudinal movement when it is positioned in the guide slots and the bore 61. A pair of diametrically opposed thumbscrews 63—63 (Fig. 1) hold the tongue 51 against lateral movement.

After the disc 30 has been clamped between the upper jaw 53 and the lower jaw 50, the thumbscrews 63—63 may be manipulated to rotate the tongue 51 about the axis of the shaft 23 so that the plate 30 and the dial 14 also may be rotated. This permits adjustment of the dial 14 with respect to the pointer 12 within close limits after the disc 30 has been clamped. After the dial is so adjusted, the thumbscrews 63—63 and the pin 61 hold the plate 30 and, therefore, the dial 14 in their adjusted positions.

A split plate 66 (Fig. 3) pivotally mounted on a bracket 67 secured to the base plate 29 serves to mount a screwdriver 71 in a bore 73 formed in its free end. The screwdriver is provided with a knurled knob 70, a cylindrical shank portion 88, a removable collar 89 and a bit 72. Slots 78 and 79 formed in the split plate 66 form clamping arms 75 and 76 (Fig. 2), whereby a clamping collar is formed on the end of the plate 66.

After the dial 14 has been clamped in a position in which the pointer 12 reads zero on the scale 13, as described hereinabove, the plate 66 is rotated in a clockwise direction, as viewed in Fig. 3, to the position in which it is shown in Fig. 3, and the bit 72 of the screwdriver 71 is positioned in a slot 77 formed in the shaft 23 and holds the shaft against rotation relative to the screwdriver 71. A switch 78 (Fig. 5) positioned in the conductor 46 then is closed and the screwdriver 71 is rotated to rotate the brush assembly 15 to a position in which it contacts the zero end of the resistance wire 16, which position is checked by the test set 35. A bolt 80 (Fig. 2) having a shoulder 81 formed thereon projects through an untapped bore 82 formed in the clamping arm 76 and is threaded into a tapped bore 83 formed in the clamping arm 75. A handle 84 is used to screw the bolt 80 into the tapped bore 83 to clamp the screwdriver 71 against rotation relative to the plate 66, or unscrew the bolt 80 to loosen the screwdriver.

After the brush assembly 15 has been moved to the zero end of the resistance wire 16, the bolt 80 is threaded farther into the tapped bore 83 formed in the arm 75, whereby the screwdriver 71 is clamped against rotation relative to the plate 66 so that the shaft 23 and the brush assembly 15 are held against movement relative to the resistance wire 16 and the dial 14. The nut 26 then is screwed farther upon the externally threaded chuck portion 25 and causes the chuck portion to firmly grip the shaft 23. Thus, the brush assembly 15 is secured to the dial 14 in a predetermined position with respect thereto. The bolt 80 then is loosened so that the screwdriver 71 is free to rotate with respect to the plate 66.

A tang 90 (Fig. 1) of a torque wrench 91 of a suitable construction is fitted into a socket 92 formed in the screwdriver, and a predetermined force is applied to the torque wrench 91, which force is transmitted to the shaft 23 by the screwdriver 70. If the chuck portion 25 of the collar 24 is fastened securely to the shaft 23, rotation of the shaft 23 is prevented as the disc 30 is secured by the upper jaw 53 and the lower jaw 50 and the collar 24 securely fastens the disc to the cover 14. But if the chuck portion 25 is not fastened securely to the shaft 23, this force will cause the shaft 23 to be rotated relative thereto, which fact may be noted and the nut 26 can be threaded more tightly upon the chuck portion 25 after reorientating the brush assembly 15 with respect to the cover 14.

After the brush assembly 15 has been secured in an orientated position with respect to the dial 14, the tang 90 of the torque wrench 91 is withdrawn from the socket 92 of the screwdriver 71, and the thumbscrews 54—54 (Figs. 1 and 2) are actuated to move the upper jaw 53 away from the disc 30 to unclamp the disc 30. The screwdriver 71 then may be used to turn the shaft 23, the brush assembly 15 and the dial 14 as a unit with respect to the potentiometer card 20 and the pointer 12, and ratios of resistance of portions of the resistance wire 16 with respect to the resistance of whole wire may then be checked by the test set 35 for predetermined readings of the pointer 12 on the scale 13. After the potentiometer 11 has been so tested, the split plate 66 is pivoted in a counterclockwise direction, as viewed in Fig. 3, the thumbscrews 54—54 are loosened, the thumbscrews 32—32 are withdrawn from the tapped bores 33—33, and the assembled and tested potentiometer 11 may be removed from the fixture 10.

In the operation of the fixture 10, the plate 66 (Fig. 3) is rotated in counterclockwise direction to a position of rest spaced over 90° from the position in which it is shown in Fig. 3. The ring 47 is fitted over the terminal posts 18, 28 and 38 and into the annular cavity 39 so that the ends of the resistance wire 16 and the brush assembly 15 are connected electrically with the test set 35. The potentiometer 11 then is placed on the base plate 29, and the thumbscrews 32—32 are screwed into the tapped bores 33—33 formed in the base 22 of the potentiometer to secure the base 22, the potentiometer card 20 and the pointer 12 in stationary positions with respect to the fixture. The dial 14 then is moved to position in which the pointer 12 reads approximately zero on the scale 13 (Fig. 2), and the thumbscrews 54—54 are actuated to clamp the plate 30 between the lower jaw 50 and the upper jaw 53. The thumbscrews 63—63 (Fig. 1) then are adjusted to move the dial 14 though the tongue 51, the jaws 50 and 53, the disc 30 and the collar 24 to a position in which the pointer reads exactly zero on the scale 13, which reading is determined within close limits by the microscope 98 (Fig. 3), which is swung to a convenient position by the arm 99.

After the dial 14 has been secured in a position in which the pointer 12 (Fig. 2) reads zero on the scale 13, the split plate 66 is swung in a clockwise direction, as viewed in Fig. 3, and the bit 72 of the screwdriver 71 is inserted into the slot 77 formed in the shaft 23. The screwdriver 71 then is turned to move the brush assembly 15 to the zero point of the resistance wire 16, which position is determined by the test set 35, and the bolt 80 is turned to clamp the screwdriver 71 in that position. The nut 26 then is threaded tightly upon the chuck portion 25 to fasten the chuck portion 25 securely to the shaft 23, and the bolt 80 is actuated to loosen the screwdriver 71 with respect to the plate 66.

The torque wrench 91 (Fig. 1) then is used to test the degree of tightness with which the chuck portion 25 of the collar 24 grips the shaft 23. If the chuck portion 25 does not grip the shaft 23 tightly enough, the brush assembly 15 is reorientated with respect to the dial 14 in the manner indicated hereinabove and the torque wrench again is utilized to test whether the chuck portion 25 grips the shaft 23 tightly enough. If the chuck portion does grip the shaft 23 tightly enough, the disc 30 is unclamped and the screwdriver 71 is actuated to rotate the dial 14 to a position in which the pointer 12 points to a predetermined marking of the scale 13, and the test set 35 is adjusted to that reading and is used to see whether the ratio of resistance of the resistance wire 16 from the zero end thereof to the point at which the brush assembly 15 contacts the resistance wire with respect to the resistance of the entire resistance wire is correct for the reading of the pointer 12 on the scale 13. This operation is repeated until all the ratios which it is desired to check have been checked.

The plate 66 then is turned in a counterclockwise direction, as viewed in Fig. 3, the thumbscrews 32—32 are withdrawn from the tapped bores 33—33 formed in the base 22, and the ring 47 and the contactors 49—49 are drawn from engagement with the terminal posts 18, 28 and 38. The fixture 10 then may be utilized to test another potentiometer like the potentiometer 11.

The fixture 10 accurately locates the brush assembly 15 with respect to the potentiometer card 20 and the scale 13 on the dial 14 and holds the brush assembly 15 in its located position while the nut 26 is threaded upon the externally threaded chuck portion 25 of the collar 24 to secure the shaft 23 and the brush assembly 15 rigidly to the dial 14. It also provides a test of the tightness of the connection between the chuck portion 25 and the shaft 23 and tests the various ratios of resistances of the assembled potentiometer 11 for the desired readings of the pointer 12 on the scale 13.

What is claimed is:

An apparatus for adjusting an article composed of at least three parts, which comprises a base member for securing one of the parts, a side clamp member on the base member for holding another of the parts against rotation relative to the first part, a plate having a slot extending longitudinally thereof to form a pair of arms, said plate having a bore formed therein in communication with the slot, a screwdriver rotatably mounted in the bore, and means for drawing arms together to clamp the screwdriver therebetween, the screwdriver serving to engage a third part, whereby rotation of the screwdriver will cause relative movement between said third part and said clamping member holding said second part to thereby finally position said parts.

JAMES O. HAMILTON.
LEON J. ROZANKOWSKI.

REFERENCES CITED

The following references are of record in the file of this patent:

UNITED STATES PATENTS

| Number | Name | Date |
|---|---|---|
| 950,548 | Frost | Mar. 1, 1910 |
| 1,694,164 | Crosthwait | Dec. 4, 1928 |
| 1,800,209 | Christopherson | Apr. 14, 1931 |
| 1,829,557 | Ewing | Oct. 27, 1931 |
| 1,870,462 | McWeeny | Aug. 9, 1932 |
| 2,169,063 | Wensley et al. | Aug. 8, 1939 |
| 2,459,228 | Konicek et al. | Jan. 18, 1949 |

FOREIGN PATENTS

| Number | Country | Date |
|---|---|---|
| 391,124 | Great Britain | Apr. 18, 1933 |